(12) United States Patent
van Schalkwyk Fourie

(10) Patent No.: US 7,126,457 B1
(45) Date of Patent: Oct. 24, 2006

(54) METHOD FOR PREVENTING THEFT OF A MOTOR VEHICLE

(76) Inventor: Willem Benjamin van Schalkwyk Fourie, 6 Compass Road Beach View, Port Elizabeth (ZA) 6011

( * ) Notice: Subject to any disclaimer, the term of this patent is extended or adjusted under 35 U.S.C. 154(b) by 162 days.

(21) Appl. No.: 10/905,618

(22) Filed: Jan. 13, 2005

(51) Int. Cl.
*B60R 25/10* (2006.01)

(52) U.S. Cl. .................... 340/426.1; 235/384
(58) Field of Classification Search ............ 340/426.1, 340/426.11, 425.5; 342/357.07; 235/384
See application file for complete search history.

(56) References Cited

U.S. PATENT DOCUMENTS

| | | | |
|---|---|---|---|
| 3,206,751 | A | 9/1965 | Knight |
| 4,177,466 | A | 12/1979 | Reagan |
| 4,596,988 | A | 6/1986 | Wanka |
| 4,905,271 | A | 2/1990 | Namekawa |
| 5,307,048 | A * | 4/1994 | Sonders ................. 340/426.12 |
| 5,389,935 | A | 2/1995 | Drouault et al. |
| 5,700,999 | A * | 12/1997 | Streicher et al. ............ 235/381 |
| 5,786,758 | A | 7/1998 | Bullock |
| 5,805,057 | A | 9/1998 | Eslaminovin |
| 5,854,609 | A | 12/1998 | Pyo et al. |
| 6,321,984 | B1 * | 11/2001 | McCall et al. .............. 235/381 |
| 6,324,393 | B1 | 11/2001 | Doshay |
| 6,360,138 | B1 * | 3/2002 | Coppola et al. ............ 700/231 |
| 6,892,119 | B1 * | 5/2005 | Sakai et al. ................... 701/36 |
| 6,900,719 | B1 * | 5/2005 | Roseman ................... 340/5.61 |

* cited by examiner

*Primary Examiner*—John Tweel, Jr.
(74) *Attorney, Agent, or Firm*—Donald R. Schoonover

(57) ABSTRACT

Information, such as make, model, serial number, color, marks, etc, associated with a motor vehicle, along with data associated with the owner of the vehicle, are registered in an information repository, such as a police station, a bureau of motor vehicles or the like. The vehicle information is stored on a registration card and/or on a decal which is permanently attached to the motor vehicle. The information can be stored in the form of a bar code. If a vehicle is stolen or otherwise operated in a manner not authorized by the owner of the vehicle, this information is input into the information repository. Fuel pumps at a fueling station are connected to the vehicle registration information either via a computer at the fuel station or a relay station at the fuel station. Before activation of the fuel pumps, the data on either the card or the decal must be read into a data port on the fuel pump. This data is compared to data stored in the repository. If the data stored in the repository indicates that the vehicle is being operated in an unauthorized manner, the fuel pump will not be activated and authorities will be notified.

10 Claims, 1 Drawing Sheet

METHOD FOR PREVENTING THEFT OF A MOTOR VEHICLE

Figure 1:
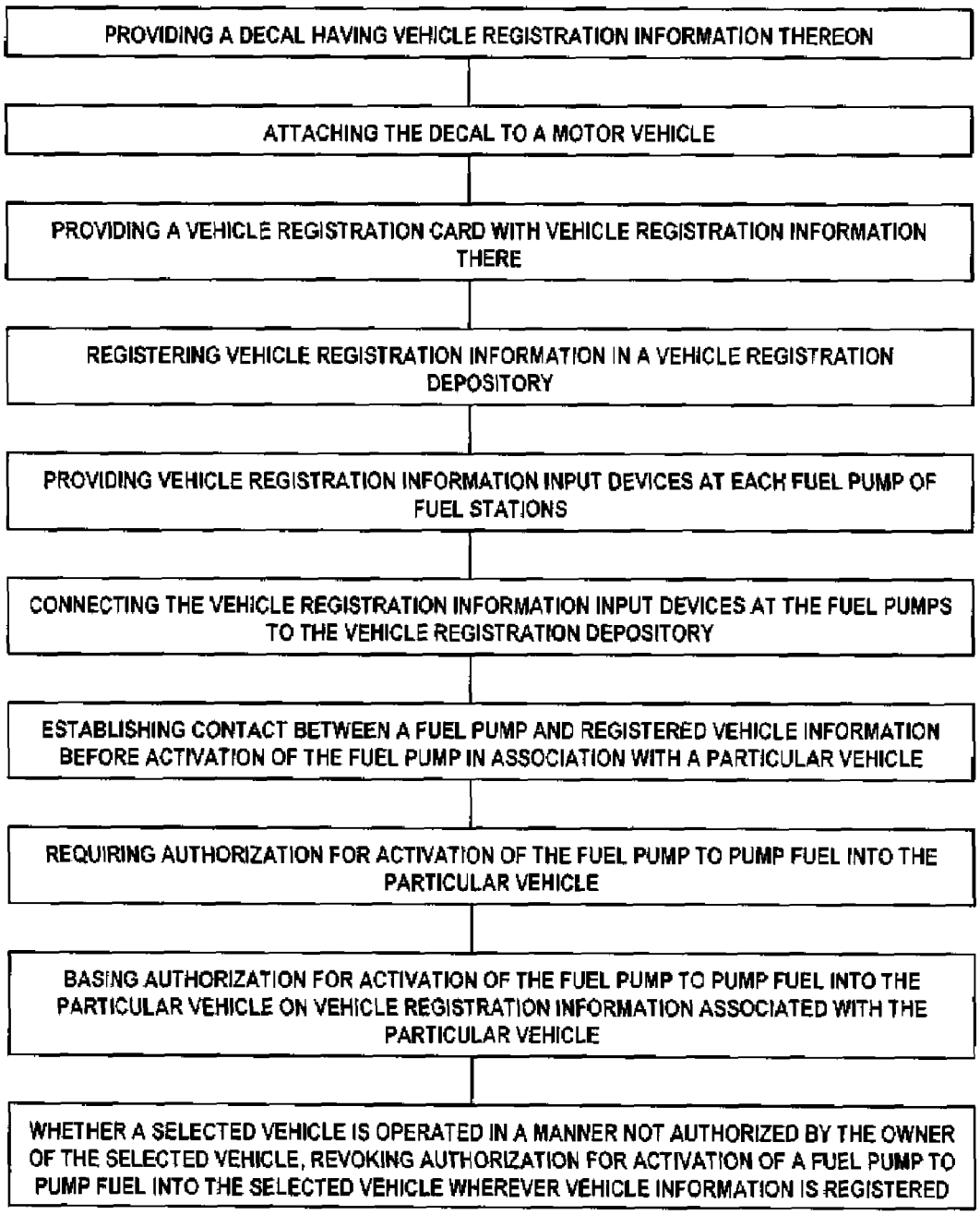

The present invention relates to the general art of motor vehicles, and to the particular field of motor vehicle anti-theft protection systems.

Motor vehicle theft is a large and growing problem. There are some vehicles that have a street life of only months in some areas of the country due to theft. Thieves are able to steal a motor vehicle in a matter of seconds and be gone before anyone is even aware of the theft.

Thus, the motor vehicle art contains many examples of anti-theft devices and systems. These devices and systems range from simple locks and locking devices, to elaborate and expensive vehicle tracking systems.

While all of these devices and systems are somewhat effective, they all lack a means for limiting movement of a motor vehicle after it has been stolen. That is, once a physical lock, such as a steering wheel bar, is defeated, the vehicle can be driven anywhere. Further, if a thief can defeat a vehicle tracking device, the vehicle can be taken anywhere.

Therefore, there is a need for a method for limiting the use of a motor vehicle that is being operated in an unauthorized manner.

Still further, some of the anti-theft devices, such as locks, are fairly easy to defeat. Once defeated, these anti-theft devices are useless.

Therefore, there is a need for a method for preventing unauthorized use of a motor vehicle which uses an anti-theft device that will prevent unauthorized use of a motor vehicle if the anti-theft device is damaged or destroyed.

While some of the physical anti-theft devices presently being used are fairly simple to install, the more elaborate systems, especially the tracking systems, are difficult and expensive to install and must be installed at the factory or at a dealership. This is expensive and may deter purchase of such an anti-theft system.

Therefore, there is a need for a method of preventing unauthorized use of a motor vehicle which is easy to install and easy to use.

Some of the existing anti-theft devices, especially the locks, merely deter theft, they do not notify authorities of the theft or alert authorities of the location of the vehicle. The tracking systems which will notify authorities of the location of the stolen vehicle rely on the vehicle owner to install the equipment necessary to carry out this operation. As discussed above, since this system may be elaborate and expensive, relying on a vehicle owner to install the required equipment may not work. The owner of the vehicle may not keep the equipment in proper working order, and thus have a failure of the equipment when the equipment and system is needed. Furthermore, if a private company is used to maintain the tracking network, the vehicle owner is dependent on the private company remaining in business for the lifetime of his or her vehicle.

Therefore, there is a need for a method of preventing unauthorized use of a motor vehicle which is easy to install and easy to use and does not require the owner of the motor vehicle or a private company to maintain the equipment or the network associated with the equipment.

To be most effective, a vehicle anti-theft system should quickly and reliably notify authorities of the location of a stolen vehicle and maintain that vehicle immobile long enough for the authorities to confiscate it. The inventor is not aware of any anti-theft system that will achieve this objective in a manner that is not complex, expensive and elaborate.

Therefore, there is a need for a method for preventing unauthorized use of a motor vehicle and which will quickly and reliably notify authorities of the location of the vehicle while maintaining that vehicle at or very near that location.

PRINCIPAL OBJECTS OF THE INVENTION

It is a main object of the present invention to provide a method for limiting the use of a motor vehicle that is being operated in an unauthorized manner.

It is another object of the present invention to provide a method of preventing unauthorized use of a motor vehicle which is easy to install and easy to use.

It is another object of the present invention to provide a method for preventing unauthorized use of a motor vehicle which uses an anti-theft device that will prevent unauthorized use of a motor vehicle if the anti-theft device is damaged or destroyed.

It is another object of the present invention to provide a method of preventing unauthorized use of a motor vehicle which is easy to install and easy to use and does not require the owner of the motor vehicle or a private company to maintain the equipment or the network associated with the equipment.

It is another object of the present invention to provide a method for preventing unauthorized use of a motor vehicle and which will quickly and reliably notify authorities of the location of the vehicle while maintaining that vehicle at or very near that location.

SUMMARY OF THE INVENTION

These, and other, objects are achieved by a method for preventing theft of a motor vehicle comprising steps of providing a vehicle registration card with vehicle registration information thereon; registering vehicle information in a vehicle registration depository; providing vehicle registration information input devices at fuel stations; connecting the vehicle registration information input devices at the fuel stations to the vehicle registration depository; establishing contact between a fuel pump and registered vehicle information before activation of the fuel pump in association with a particular vehicle; requiring authorization for activation of the fuel pump to pump fuel into the particular vehicle; basing authorization for activation of the fuel pump to pump fuel into the particular vehicle on vehicle registration information associated with the particular vehicle; and whenever a selected vehicle is operated in a manner not authorized by the owner of the selected vehicle, revoking authorization for activation of a fuel pump to pump fuel into the selected vehicle wherever vehicle information is registered.

Using the method embodying the present invention will permit tracking of a motor vehicle which may be operated in a manner that is not authorized by the owner of that vehicle and will also permit limiting movement of that vehicle and notifying authorities of the location of that vehicle. The method includes a decal or a card having vehicle registration, including a fingerprint of the owner, imprinted thereon. The decal is permanently applied to the motor vehicle and if it is removed, it will be destroyed. The card also has the information imprinted thereon in a manner that will destroy the information if change is attempted. The vehicle data is registered by the vehicle owner when he or she purchases or otherwise gains authorized access to the vehicle. The card or decal will be changed along with the registered data when ownership of the vehicle is transferred in an authorized transaction. In this manner, theft of motor vehicles can be reduced and controlled.

BRIEF DESCRIPTION OF THE DRAWING FIGURES

The FIGURE shows the steps included in the method for preventing theft of a motor vehicle embodying the present invention.

DETAILED DESCRIPTION OF THE PREFERRED EMBODIMENT

Other objects, features and advantages of the invention will become apparent from a consideration of the following detailed description and the accompanying drawings.

Referring to the FIGURE, it can be understood that the present invention is embodied in a method for preventing theft of a motor vehicle. The method will be described with reference to the FIGURE and achieves the above-stated objectives.

The method includes providing a decal having vehicle registration information thereon. The decal will have all the pertinent information thereon. The information can include the make, model, year, color, license plate number, serial number of the car, signature of the vehicle owner or person authorized to operate the vehicle, any special identifying indicia, such as marks, or the like, as well as the data pertinent to the owner of the vehicle, such as a fingerprint of the owner, or the like. This data can be placed on the decal in the form of a bar code or other suitable markings such as might be found in smart cards, or the like. The decal will be permanently affixed to the vehicle and will be affixed in a manner that will require destroying the decal, or at least the data-containing portion of the decal, to remove or change the decal. This data is placed on the decal when the vehicle is initially purchased and is changed by one owner during the authorized transfer of ownership or control of the vehicle to another.

The method further includes attaching the decal to a motor vehicle. The most likely place to attach the decal is on a window of the vehicle, but other locations can also be used without departing from the scope of the present disclosure.

The method further includes providing a vehicle registration card with vehicle registration information thereon. The registration card will resemble a smart card and can have the same information as hereinbefore discussed with regard to the decal. The information can also be placed on the card in the form of a bar code.

The method further includes registering vehicle information in a vehicle registration depository. The most convenient depository is the Bureau of Motor vehicles. This Bureau can be local, Regional or National or all or any combination thereof. However, local police departments as well as a National Vehicle Registry can be used. This information is placed in the depository when the vehicle is initially purchased and changed when ownership or control of the vehicle is transferred from one individual to another in an authorized manner.

The method further includes providing vehicle registration information input devices at each fuel pump of fuel stations. These input devices can be bar code readers or smart card readers. The devices will read the information on either the decal or on the registration card.

The method further includes connecting the vehicle registration information input devices at the fuel pumps to the vehicle registration depository. Any information read by the reader will be transferred to the registry. In some cases, a computer can be located at each fuel station. The data read by the data readers at the fuel pumps will be transferred to the computer at the fuel station. This computer can be connected to the main registry, such as the police or bureau of motor vehicles or the national registry, and will be kept up to date.

The method further includes establishing contact between a fuel pump and registered vehicle information before activation of the fuel pump in association with a particular vehicle.

The method further includes requiring authorization for activation of the fuel pump to pump fuel into the particular vehicle. When a vehicle pulls up adjacent to a fuel pump, the vehicle operator must expose either the decal on the motor vehicle or the card to the data input device associated with the fuel pump. This can be done via a bar code and a bar code reader or other suitable device, such as a device that can scan and interpret a fingerprint. The data is then read from the decal or the card into the fuel pump data acquisition device and then transferred either to the data control station at the fuel station or to the local data depository or to the national data depository, whichever is suitable. This data is then analyzed at the data depository and compared to the data on file at the depository. As hereinafter discussed, if a motor vehicle is stolen or operated in an unauthorized manner, the owner of the vehicle, or other person responsible for the vehicle, will report such action. This report will cause a flag to be placed on the data associated with that motor vehicle. As soon as the data is accessed during a fueling operation, the motor vehicle will be immediately identified, and appropriate action can be taken.

The method further includes basing authorization for activation of the fuel pump to pump fuel into the particular vehicle on vehicle registration information associated with the particular vehicle.

Whenever a selected vehicle is operated in a manner not authorized by the owner of the selected vehicle, revoking authorization for activation of a fuel pump to pump fuel into the selected vehicle wherever vehicle information is registered. The authorization can be revoked by reporting a stolen vehicle to the proper authorities who, in turn, will update the information associated with that vehicle. This up-dated information will then be transferred to all subscribers to the data bank, such as the local police departments, local fuel stations, local Bureaus of Motor Vehicles, or the like. As soon as activation of a fuel pump is requested, the location of the vehicle will be immediately known, and the fuel pump will not be authorized to pump fuel. As soon as the fuel pump notifies the registry of the motor vehicle that is being operated in an unauthorized manner, the local authorities can be notified, and police or other such agency can be dispatched.

Since the fuel pump will not be activated, the motor vehicle cannot be re-fueled and will thus remain low on fuel or exhausted of fuel. The out-of-fuel vehicle will not go anywhere.

In this manner, the location of the motor vehicle will be known, and the motor vehicle will not be able to move because it will be out of fuel. At the very least, it will not be able to move very far as it will be at least very low on fuel. This will make recovery easy.

It is understood that while certain forms of the present invention have been illustrated and described herein, it is not to be limited to the specific forms or arrangements of parts described and shown.

What is claimed is:

1. A method for preventing theft of a motor vehicle comprising:
    (a) providing a decal having vehicle registration information thereon;
    (b) attaching the decal to a motor vehicle;
    (c) providing a vehicle registration card with vehicle registration information thereon;
    (d) registering vehicle information in a vehicle registration depository;
    (e) providing vehicle registration information input devices at each fuel pump of fuel stations;
    (f) connecting the vehicle registration information input devices at the fuel pumps to the vehicle registration depository;
    (g) establishing contact between a fuel pump and registered vehicle information before activation of the fuel pump in association with a particular vehicle;
    (h) requiring authorization for activation of the fuel pump to pump fuel into the particular vehicle;
    (i) basing authorization for activation of the fuel pump to pump fuel into the particular vehicle on vehicle registration information associated with the particular vehicle; and
    (j) whenever a selected vehicle is operated in a manner not authorized by the owner of the selected vehicle, revoking authorization for activation of a fuel pump to pump fuel into the selected vehicle wherever vehicle information is registered.

2. The method as described in claim 1 including a step of providing vehicle registration information on the decal in the form of a bar code.

3. The method as described in claim 2 including a step of providing vehicle registration information on the vehicle registration card in the form of a bar code.

4. The method as described in claim 3 wherein a vehicle registration depository is located at a police station.

5. The method as described in claim 4 wherein a vehicle registration depository is located at a Bureau of Motor Vehicles.

6. The method as described in claim 5 wherein a vehicle registration depository is located at the fuel station.

7. The method as described in claim 6 wherein the vehicle registration depository at a police station is connected to a vehicle registration depository at the Bureau of Motor Vehicles and to the vehicle registration depository at the fuel station.

8. The method as described in claim 1 further including a step of notifying police authorities when a fuel pump cannot be activated because it is not authorized to be activated.

9. A method for preventing theft of a motor vehicle comprising:
    (a) providing a vehicle registration card with vehicle registration information thereon;
    (b) registering vehicle information in a vehicle registration depository;
    (c) providing vehicle registration information input devices at fuel stations;
    (d) connecting the vehicle registration information input devices at the fuel stations to the vehicle registration depository;
    (e) establishing contact between a fuel pump and registered vehicle information before activation of the fuel pump in association with a particular vehicle;
    (f) requiring authorization for activation of the fuel pump to pump fuel into the particular vehicle;
    (g) basing authorization for activation of the fuel pump to pump fuel into the particular vehicle on vehicle registration information associated with the particular vehicle; and
    (h) whenever a selected vehicle is operated in a manner not authorized by the owner the selected vehicle, revoking authorization for activation of a fuel pump to pump fuel into the selected vehicle wherever vehicle information is registered.

10. The method as described in claim 1 wherein the step of registering vehicle information in a vehicle registration depository includes registering the information whenever ownership or control of the vehicle is transferred in an authorized manner.

* * * * *